United States Patent
Johannessen et al.

(10) Patent No.: US 8,449,857 B2
(45) Date of Patent: May 28, 2013

(54) METHOD FOR SATURATING AND RE-SATURATING AMMONIA STORAGE MATERIAL IN CONTAINERS

(75) Inventors: Tue Johannessen, Glostrup (DK); Ulrich Joachim Quaade, Bagsværd (DK); Johnny Johansen, København (DK); Henrik Wagner-Pedersen, Humlebæk (DK)

(73) Assignee: Amminex A/S, Søborg (DK)

( * ) Notice: Subject to any disclaimer, the term of this patent is extended or adjusted under 35 U.S.C. 154(b) by 230 days.

(21) Appl. No.: 12/899,667

(22) Filed: Oct. 7, 2010

(65) Prior Publication Data

US 2011/0284121 A1 Nov. 24, 2011

Related U.S. Application Data

(60) Provisional application No. 61/346,209, filed on May 19, 2010.

(30) Foreign Application Priority Data

May 19, 2010 (EP) .................................... 10005245
Sep. 30, 2010 (EP) .................................... 10012279

(51) Int. Cl.
*F17C 11/00* (2006.01)
(52) U.S. Cl.
USPC .............................. 423/352; 95/128; 206/0.7
(58) Field of Classification Search
USPC ............... 95/128; 206/0.7; 423/352; 429/515
See application file for complete search history.

(56) References Cited

U.S. PATENT DOCUMENTS

| | | | |
|---|---|---|---|
| 6,387,336 B2 * | 5/2002 | Marko et al. ................... | 423/212 |
| 6,647,930 B2 * | 11/2003 | Nurmi ........................... | 122/4 R |
| 8,088,201 B2 * | 1/2012 | Johannessen ................... | 96/108 |
| 2004/0146441 A1 * | 7/2004 | Lang et al. ..................... | 423/235 |
| 2004/0182246 A1 * | 9/2004 | Grantham et al. .............. | 96/421 |
| 2005/0247050 A1 * | 11/2005 | Kaboord et al. ................ | 60/286 |
| 2009/0301600 A1 | 12/2009 | Kaefer | |

(Continued)

FOREIGN PATENT DOCUMENTS

| | | |
|---|---|---|
| CN | 101 696 020 | 4/2010 |
| WO | WO 2006/012903 | 2/2006 |
| WO | WO 2006/130113 | 12/2006 |
| WO | WO 2010/025947 | 3/2010 |

OTHER PUBLICATIONS

U.S. Appl. No. 12/570,426, filed Sep. 30, 2009, Svagin et al.

(Continued)

*Primary Examiner* — Frank Lawrence, Jr.
(74) *Attorney, Agent, or Firm* — Frost Brown Todd LLC (57) ABSTRACT

A method for saturating or re-saturating ammonia storage material (1) capable of reversibly absorbing and desorbing ammonia in one or more storage containers (2), wherein said material is partly or fully depleted of ammonia, with ammonia to a predetermined saturation degree comprises a. placing the storage container(s) (2) in direct or indirect contact with a thermostatting medium (4) at a temperature level $T_T \leqq$ about 65° C.; and b. connecting the storage container(s) (2) to a source of gaseous ammonia wherein at least during a part of the method the gaseous ammonia during saturating or re-saturation of the ammonia storage material (1) is at a pressure $P_S \leqq$ about $P_T$, wherein $P_S$ is the ammonia pressure during saturating or re-saturating of the ammonia storage material (1) and $P_T$ is the equilibrium vapor pressure of liquid ammonia at the temperature level $T_T$.

25 Claims, 7 Drawing Sheets

U.S. PATENT DOCUMENTS

2010/0021780 A1* 1/2010 Johannessen et al. .......... 429/19
2010/0062296 A1* 3/2010 Johannessen .................. 429/19

OTHER PUBLICATIONS

Elmoe, T., "A high-density ammonia storage/delivery system based on $Mg(NH_3)_6Cl_2$ for SCR-DeNO$_x$ in vehicles," Chemical Engineering Science, vol. 61 (2006) pp. 2618-2625.

Lin, R.B. et al., "Investigation on performances of the novel ammonia-based hydrogen storage material CaCl2," Journal of Inorganic Materials (Sep. 2008) pp. 1059-1063 (Abstract).

Yu, X. et al., "Method for preparing efficient low-temperature ammonia-storing material," (Apr. 21, 2010) (Abstract for CN1016020).

* cited by examiner

$T_{Eq}$: Equilibrium temperature of $SrCl_2(NH_3)_8Cl_2$

CG: Cooling gradient between $T_T$ (temperature of thermostatting medium) and $T_{Eq}$ (approx. temperature of $SrCl_2$ undergoing exposure to $P_S$ ($T_T$))

$NH_3$: Pressure of liq. $NH_3$ at temperature $T_T$

METHOD FOR SATURATING AND RE-SATURATING AMMONIA STORAGE MATERIAL IN CONTAINERS

FIELD OF THE INVENTION

The present invention relates to method for saturating or re-saturating ammonia storage material capable of reversibly absorbing and desorbing ammonia in one or more storage containers, wherein said material is partly or fully depleted (or partly or fully empty) of ammonia, with ammonia to a predetermined saturation degree.

BACKGROUND OF THE INVENTION

Ammonia is a widely used chemical with many applications. Example of applications are ammonia as reductant for selective catalytic reduction (SCR) of $NO_x$ in exhaust gas from combustion processes or as ammonia-based energy storage for fuel cell applications.

For most applications, and in particular in automotive applications, the storage of ammonia in the form of a pressurized liquid in a vessel is too hazardous. A storage method involving ad- or absorption of molecular ammonia in a solid material kept in a container can circumvent the safety hazard of anhydrous liquid ammonia and enable the use of ammonia in mobile or de-central applications Metal amine salts are ammonia absorbing and desorbing materials, which can be used as solid storage medium for ammonia (see e.g. WO 2006/012903 A2), which in turn, as mentioned above, may be used as the reductant in selective catalytic reduction to reduce $NO_x$ emissions. Using the storage method for ammonia-mediated energy storage for fuel cell applications is another attractive field of application.

The initial saturation of ammonia storage material in a container with ammonia is, of course, accomplished before the container, after saturation of the storage material which may be accomplished within the container, is mounted on a vehicle or attached to another system where it is used. On-board re-saturation of storage material which is ammonia-depleted by consumption is impractical because of the requirement of liquid ammonia storage by the end user. Therefore, the container should rather be replaced by a unit that is fully saturated and the partly or fully ammonia-depleted unit should be re-saturated in a facility suited for this. However, industrial facilities for the cost-effective re-saturation of ammonia storage material in containers with reliable quality assurance methods required for automotive applications do not exist on the market and a simple process with low degree of individual monitoring for providing a reliable product is required.

SUMMARY OF THE INVENTION

A method for saturating or re-saturating ammonia storage material capable of reversibly absorbing and desorbing ammonia in one or more storage containers, wherein said material is partly or fully depleted (or partly or fully empty) of ammonia, with ammonia to a predetermined saturation degree is provided said method comprising:
a. placing the storage container(s) in direct or indirect contact with a thermostatting medium at a temperature $T_T \leq$ about 65° C.; and
b. connecting the storage container(s) to a source of gaseous ammonia wherein at least during a part of the method the gaseous ammonia during saturating or re-saturating of the ammonia storage material is at a pressure $P_S \leq$ about $P_T$, wherein $P_S$ is the ammonia pressure during saturating or re-saturating of the ammonia storage material and $P_T$ is the equilibrium vapor pressure of liquid ammonia at the temperature $T_T$.

Other features of the invention presented herein are inherent in the methods disclosed or will become apparent to those skilled in the art from the following detailed description of embodiments and its accompanying drawings.

BRIEF DESCRIPTION OF THE DRAWINGS

FIG. 3b shows an ultra-sound generator that may influence the stability of the material during the process.

GENERAL DESCRIPTION AND DESCRIPTION OF EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

This invention relates to a method for saturation or re-saturation of ammonia storage material in cartridges that are used for safe transport and controlled release of ammonia in mobile or de-central applications where safety is obtained by having ammonia stored in absorbed state in a stolid storage material that requires heat to release the ammonia by thermal desorption. When the storage material in the cartridges is partly of fully depleted or empty of ammonia either before the first use, after having been filled into a container, or after use in a given application, it can be saturated or re-saturated, respectively, with ammonia in a process that combines low operating cost, simple control layout, ease of monitoring during saturation or re-saturation process and reliable quality assurance.

In this application (i.e. in the specification and the claims), the term "saturating ammonia storage material (in a storage container)" or "saturation of ammonia storage material (in a storage container)" refers to the initial saturation or first saturation of an ammonia storage material after the material being partly or fully empty of ammonia has been filled into a storage container, unless the context clearly dictates that both saturating and re-saturating (see below) or saturation and re-saturation (see below) is meant. The term "re-saturating ammonia storage material (in a storage container)" or "re-saturation of ammonia storage material (in a storage container)" refers to a second, third, fourth or still further saturation, after the ammonia storage material has desorbed ammonia or is fully or partially depleted of ammonia in the container for the first or further times upon or after use as an ammonia source for a device or process.

The term "termostatting medium" refers to a medium which is capable to keep the temperature of the container and/or its content at desired temperature, which includes keeping the container and/or its content at a temperature having a desired temperature gradient. Usually, the thermostatting medium is a cooling medium.

Accelerated saturation or re-saturation of solid ammonia storage material with ammonia in one or more ammonia storage container(s), which usually have just one opening, namely the ammonia inlet or conduct leading to the ammonia source, requires efficient removal of heat. In addition, it is well known from the literature that a higher supply pressure in an absorption process increases the affinity of the storage material to the molecule, here ammonia. As a result, one would expect that the optimal method would be cooling at as low temperature as possible and using as high supply pressure as possible for kinetics. However, this may lead to condensation of ammonia inside the container instead of solely binding in the material. This is a challenge for a process whereby multiple fully or partly ammonia-depleted or ammonia-empty cartridges are to be saturated or re-saturated in parallel.

A suitable method of saturation or re-saturation that avoids the risk of condensation is to ensure that the supply pressure during at least a part of saturation or re-saturation, preferably during the final stage thereof, such as during the last about ⅓ of the total saturation period or wherein the last about 25% of the predetermined saturation degree is achieved, is not higher than the corresponding equilibrium pressure of ammonia at the operating temperature of the saturation process.

Accordingly, the method of the invention for saturating or re-saturating ammonia storage material capable of reversibly absorbing and desorbing ammonia in one or more storage containers, wherein said material is partly or fully depleted or empty of ammonia, with ammonia to a predetermined saturation degree comprises:

a. placing the storage container(s) in direct or indirect contact with a thermostatting medium at a temperature $T_T \leq$ about 65° C.; and
b. connecting the storage container(s) to a source of gaseous ammonia wherein at least during a part of the method the gaseous ammonia during saturating or re-saturating of the ammonia storage material is at a pressure $P_S \leq$ about $P_T$, wherein $P_S$ is the ammonia pressure during saturating or re-saturating of the ammonia storage material (1) and $P_T$ is the equilibrium vapor pressure of liquid ammonia at the temperature $T_T$.

Before a container undergoes saturation or re-saturation, it is advantageous to inspect it as to whether the unit is intact. A first step is usually a visual inspection to check for dents etc.

Then, possible volatile impurities in the container may be removed.

For example, the container may be evacuated by means of a vacuum pump, to remove any inert gas ($N_2$ or oxygen from the surrounding air) until the gas being removed has an ammonia content of at least about 90%, preferably at least about 95% or even about 98% by volume so as to avoid that the absorption rate is controlled by gas diffusion through an inert gas that remains in the pore structure of the solid in the container.

The gas exiting the container, which is evacuated by connection to a pump, may be analyzed with respect to a tracer molecule such as helium to which the outside of the container is exposed to or a molecule present in normal air such as nitrogen or oxygen (e.g. by means of gas chromatography or mass spectrometry) to evaluate if there is a leak in the container. In the pumped-off gas also other undesirable absorbed species, such as $H_2O$, organic species and other volatile components besides ammonia may be detected. Leaks may also be detected by a too high pressure level remaining after evacuation. If the container or the ammonia depleted storage material therein would not meet the necessary requirements, it would be sorted out.

In another embodiment, possible volatile impurities may be removed by flushing the cartridge with ammonia, repeatedly pressurizing with ammonia and depressurizing or by any other way of removing gaseous impurities from the cartridge until the impurity gas content is equal to or below about 10%, preferably about 5% or about 2% by volume or, in other words, the ammonia content of the gas remaining in the container is at least about 90%, preferably about 95% or about 98% by volume.

A leak test of the container as described above may also be applied after saturation or re-saturation of the storage material.

The thermostatting medium is used to control the temperature of the process including that of the containers and the storage material and to dissipate the heat of absorption associated with the saturation or re-saturation process, which is usually conducted in a bath or chamber containing the thermostatting medium. It may be various liquids or gases but it is preferred that it is an inexpensive material such as water or a monophasic aqueous medium, such as a salt solution or a mixture of water and glycerine. $T_T$, the temperature level of the thermostatting medium, is equal to or less than about 65° C. so as to limit the ammonia pressure in the container to a pressure of about 30 bars or less. In general, it is advantageous that $T_T$, the temperature level of the thermostatting medium, is equal to or higher than the freezing point of water, i.e. about 0° C., up to about 40° C. or less, where the potential evaporation from liquid surface in an open thermostatting bath is limited. To have more efficient cooling it is advantageous that the temperature level is from about 20° C. or about 10° C. to about 0° C. However, it may also be preferred to be above room temperature, such as from about 20° C. to about 40° C., e.g. at about 20° C., because it limits the requirement for insulating the cooling bath when it is not cooler than room temperature.

The thermostatting medium is either in direct contact with the container(s) on in indirect contact, such as via a insulating shell surrounding the container(s) or a heat exchanger.

The contact of the thermostatting medium with the container may be a complete contact, e.g. by immersing the container completely in a thermostatting medium, or a partial contact, e.g. by immersing the container only partly in the thermostatting medium, or by insulating e.g. the upper part of the container provided with the ammonia inlet from the thermostatting medium.

During saturation or re-saturation of the ammonia-depleted storage material, the condensation of ammonia in the container should be avoided for the above-mentioned reasons. In principle, the fundamental condition is to have an ammonia pressure that is about equal to or lower than the equilibrium ammonia pressure of the coldest spot in the cartridge. This is the case when the ammonia pressure at the temperature $T_T$ of the thermostatting medium is about equal to or below the equilibrium ammonia pressure of liquid ammonia at $T_T$. Since the saturation or re-saturation process is exothermic, the thermostatting medium ensures that the entire ammonia storage material in the container is at about or above the temperature $T_T$ so that no condensation can take place when the above criterion is fulfilled. It is sufficient to control the temperature of the thermostatting medium which avoids the necessity of monitoring the temperature inside the container.

Since in the beginning of the saturation or re-saturation the process may be highly exothermic, it may be sufficient that the above criterion c) is fulfilled only after an initial phase, preferably at least in the final phase of saturation or re-saturation when the absorption process slows down and the cartridge temperature becomes close to $T_T$ throughout the container For example, the condition $P_S \leqq$ about $P_T$ may be kept only during the final phase of absorption wherein e.g. about 25% of the target degree of ammonia saturation are absorbed, or during about the last ⅓ of the total time needed for saturation or re-saturation.

It is preferable to avoid slow saturation at the end of the container opposite to the ammonia inlet, since otherwise the storage material close to the ammonia inlet may be saturated at a faster rate than the storage material at the opposite end of the container and the saturation or re-saturation of the storage material at the end of the container opposite to the ammonia inlet be impeded.

This can be controlled in several ways. In some embodiments, the part of the container or cartridge close to the ammonia inlet is insulated, e.g. about 50% or less, about 25% or less or about 10% or less, such as about 5% or even less, of the surface of the cartridge may be covered with an insulating material during part of or the whole saturation time. In some embodiments about 50% of the surface is covered in the beginning the process and then less and less surface is covered during the progress of saturation or re-saturation, In some embodiment the thermostatting medium is applied only at the end of the cartridge opposite to the inlet, so as to increase the saturation speed in that part of the cartridge. The level of the thermostatting medium in thermostatting bath may furthermore be increased with increasing saturation, starting at the end away from the ammonia inlet, until it completely covers the cartridge at the end of the saturation process. Another way of controlling the saturation speed is to provide for a temperature or heat dissipation gradient in the thermostatting medium from colder at the end of the cartridge further away from the inlet to warmer at the end with the inlet, e.g. cooling the lower part of the container with the thermostatting medium more than the upper part and/or by flowing the thermostatting medium at a higher rate past the cartridge at its bottom part opposite to the inlet than past the upper part with the inlet.

Furthermore, it is also possible to reduce the density of the storage material inside the container for controlling the saturation speed, if a high density is not so important.

These measures can lead to a saturation speed which is about the same in all parts of the cartridge or somewhat faster in the parts away from the ammonia inlet.

To avoid condensation but at the same time have as high supply pressure $P_S$ as possible in order to accelerate the saturation or re-saturation process, it is preferred that the supply pressure of gaseous ammonia is at least about 50% of the equilibrium vapor pressure $P_T$ of ammonia at the operating temperature $T_T$. It is even more preferred if the pressure, $P_S$, is at least about 75% or about 90% of $P_T$.

The ammonia storage material capable of reversibly absorbing and desorbing ammonia (the latter usually by supplying heat to the material and/or lowering the pressure above the material) may be any material known to be capable to react in such a way, e.g. certain zeolites, acid-treated carbons or metal salts that can from metal amine salts.

In a preferred embodiment, the ammonia storage material is at least one metal salt capable of reversibly absorbing and desorbing ammonia, which, in its form where it has absorbed ammonia, is metal amine complex salt (also just referred to as metal amine salt). Preferred metal amine salts have the formula $M_a(NH_3)_nX_z$, wherein M is one or more cations selected from alkali metals such as Li, Na, K or Cs, alkaline earth metals such as Mg, Ca, Sr or Ba, and/or transition metals such as V, Cr, Mn, Fe, Co, Ni, Cu, or Zn or combinations thereof, such as NaAl, KAl, $K_2Zn$, CsCu, or $K_2Fe$; X is one or more anions selected from fluoride, chloride, bromide, iodide, nitrate, thiocyanate, sulphate, molybdate, and phosphate ions; a is the number of cations per salt molecule; z is the number of anions per salt molecule; and n is the coordination number of 2 to 12, preferably 6 to 8.

$Mg(NH_3)_6Cl_2$, $Ca(NH_3)_8Cl_2$, $Mn(NH_3)_6Cl_2$ and $Sr(NH_3)_8Cl_2$ and any mixture thereof are particularly preferred.

The ammonia storage materials used in the present invention can be in ammonia-saturated or substantially ammonia saturated form, wherein the majority or sometimes virtually all of the sites in the material that can be occupied by ammonia are occupied thereby, for example wherein at least about 80%, about 90%, about 95% or about 98% are occupied. This is also termed "a saturation degree of at least about 80%, about 90%, about 95% or about 98%". In most cases a stoichiometrically complete saturation is difficult or impossible to achieve, and therefore the term "ammonia-saturated" includes e.g. the highest degree of saturation that can reasonably be achieved practically but does not correspond to the stoichiometric full saturation, i.e. a saturation degree of e.g. about 95% or more or about 97%, about 98% or about 99% or more. It is preferred that when the ammonia saturated material is a metal amine salt the saturated metal amine salt is used in a compressed form in which it has a density ("bulk density") of at least about 50%, about 75%, about 80%, about 85%, about 90% or about 95% or more of the single crystal density (the "normal" density of the solid material, i.e. the density of a single crystal of the solid material).

The ammonia storage materials used in the present invention can also be in ammonia-depleted or ammonia-empty form. This means a saturation degree less than the above saturation degrees, i.e. a saturation degree of less than about 80%. The depletion or emptiness can be from any saturation degree of less than about 80%, e.g. about 60%, about 50%. about 40%, about 20%, about 10% or less (herein referred to as "partially depleted") to virtually (e.g. about 5%, about 3% or about 2% or less) or even exactly 0% (herein referred to as "fully depleted"), the latter being the plain metal salt, from which the metal amine salt is derived.

Ammonia-depletion or ammonia-emptiness is usually reached when ammonia is desorbed from an ammonia-saturated salt, e.g. by heating the same or applying vacuum thereto, for example for using the ammonia in some kind of chemical reaction, such as selective catalytic reduction of $NO_x$, or is present when ammonia-empty (-depleted) or partially ammonia-empty (-depleted) storage material is initially filled into a container or cartridge.

The ammonia storage material may be charged with one or more heat-conducting materials or surrounded by or wrapped in one or more gas-permeable enclosures made of one or more flexible heat-conducting materials having a higher thermal conductivity than the ammonia storage material and not being an ammonia storage material themselves (as e.g. disclosed in the co-pending European Patent Application No. 09 012 469 or U.S. patent application Ser. No. 12/570,426), This is, of course, accomplished before its first use. The thermal conductivity of the heat-conducting materials is generally at least about five times, such as at least about 10 times or about 20 times of that of the ammonia storage material both in its ammonia-depleted or ammonia-empty form and its ammonia-saturated form over at least a temperature range of from about −70° C. to about 250° C. The heat-conducting materials comprise e.g. metals or metal alloys, graphite, composite materials, e.g. plastic that has been modified to be heat conductive, rubber that has been modified to be heat conductive, and/or any mixtures thereof as well as composites of heat conducting materials, as mentioned above, with materials having a thermal conductivity about equal to or smaller than the ammonia storage material, as long as the overall heat conductivity is higher than that of the storage material.

"Saturating or re-saturating ammonia storage material that is partly or fully depleted with or empty of ammonia" means to contact the partly or fully depleted or empty ammonia storage material with ammonia upon which the material absorbs ammonia. This is usually an exothermic reaction. The saturation or re-saturation can be conducted to any desired or predetermined saturation degree. Often it is desired or predetermined to saturate or re-saturate the material to the saturation degree where it is termed "saturated", i.e. to a saturation degree of at least about 80%, about 90%, about 95% or about 98%.

The "equilibrium pressure" at a temperature T is uniquely defined by the ammonia absorbing/desorbing substance. It is defined as the ammonia pressure in a system consisting of a closed container containing (partly or fully) saturated ammonia storage material and gaseous ammonia, when the system has reached thermal equilibrium at the temperature T. Often the equilibrium pressure can be described by the desorption enthalpy ΔH and the desorption entropy ΔS of the material through the van't Hoff relationship: $\ln_{(Peq/P0)} = -\Delta H/(RT) + \Delta S/R$. where R where R is the gas constant.

It is usually desirable to keep the temperature level of the thermostatting medium more or less constant. For this end, a cooling means can be used to compensate for the heat released by the exothermic process of saturation or re-saturation.

It is furthermore advantageous that the rate of removal of heat produced during saturation or re-saturation from around the container(s) (2) by the thermostatting medium is accelerated, e.g. by generating forced convection of the thermostatting medium. This can be done by a fan, propeller, a pump or other normal means for moving a fluid, which increases the heat transfer coefficient. As mentioned above a heat dissipation gradient in the thermostatting medium from colder at the end of the cartridge further away from the inlet to warmer at the end with the inlet achieved e.g. by flowing the thermostatting medium at a higher rate past the cartridge at its bottom part opposite to the inlet than past the upper part with the inlet may be advantageous.

The state or progress of saturation or re-saturation may be monitored by monitoring the ammonia flow e.g. by means of a flow meter or may be indirectly monitored or determined by the power requirement for the cooling means because a slow saturation process will not require much additional cooling to keep the temperature level $T_T$.

In embodiments of the invention, the gaseous ammonia pressure is generated by evaporation of ammonia using the thermostatting medium at the temperature level $T_T$ as a heat source for the ammonia evaporation thereby automatically obtaining a saturation pressure, $P_S$, which is close to or equal to $P_T$. At the same time, one obtains a reduction in the total power demand for the cooling means during saturation or re-saturation to maintain the thermostatting medium at the temperature $T_T$ because the release of absorption heat from the containers is partly compensated for by the energy requirement for the phase transition (evaporation) of ammonia from liquid to gas.

In embodiments, the evaporation of ammonia may be accomplished in an evaporation chamber, often within the bath or chamber wherein the saturation or re-saturation process is accomplished, which is fed by liquid ammonia from a separate storage tank or unit. This evaporation chamber is in direct or indirect contact with the thermostatting medium to create the proper gas phase pressure and at the same time assist with keeping the medium at a certain temperature $T_T$ which would otherwise rise because of the release of heat from the containers undergoing saturation or re-saturation.

In another embodiment, the thermostatting medium at temperature $T_T$ is used as a heat transfer medium—either directly or via a heat exchanger—to provide the heat of vaporization to the separate liquid ammonia storage unit.

After the saturation or re-saturation is terminated, the examination of the saturated or re-saturated cartridges can be done by weighing as well as by using a pump to make a final analysis of the composition of the gas inside the saturated or re-saturated unit and to check if a unit has developed a leak. This can also be done with the use of a pressure sensor linked to a controller. Any unit not meeting the necessary requirements will be discarded.

Furthermore, a final step of applying vacuum is advantageous once the saturation or re-saturation process is considered terminated. When the pressure has been reduced to the ammonia vapor pressure of the saturated storage material at the temperature $T_T$, the units are ready for final visual inspection without the risk of moving containers with elevated pressure inside.

It is further envisaged by the invention that an ultra-sound generator may be applied during the saturation or re-saturation process to introduce relaxations in the structure of the ammonia storage material in the container(s) as it absorbs ammonia. It is known that some materials may expand under such absorption processes and ultra-sound waves may limit the stresses on the walls of the container. The ultra-sound waves may be applied using the thermostatting medium as part of the wave guidance.

In the Figures, common reference numerals are used to refer to same or similar materials, devices or processes.

Figure 1:
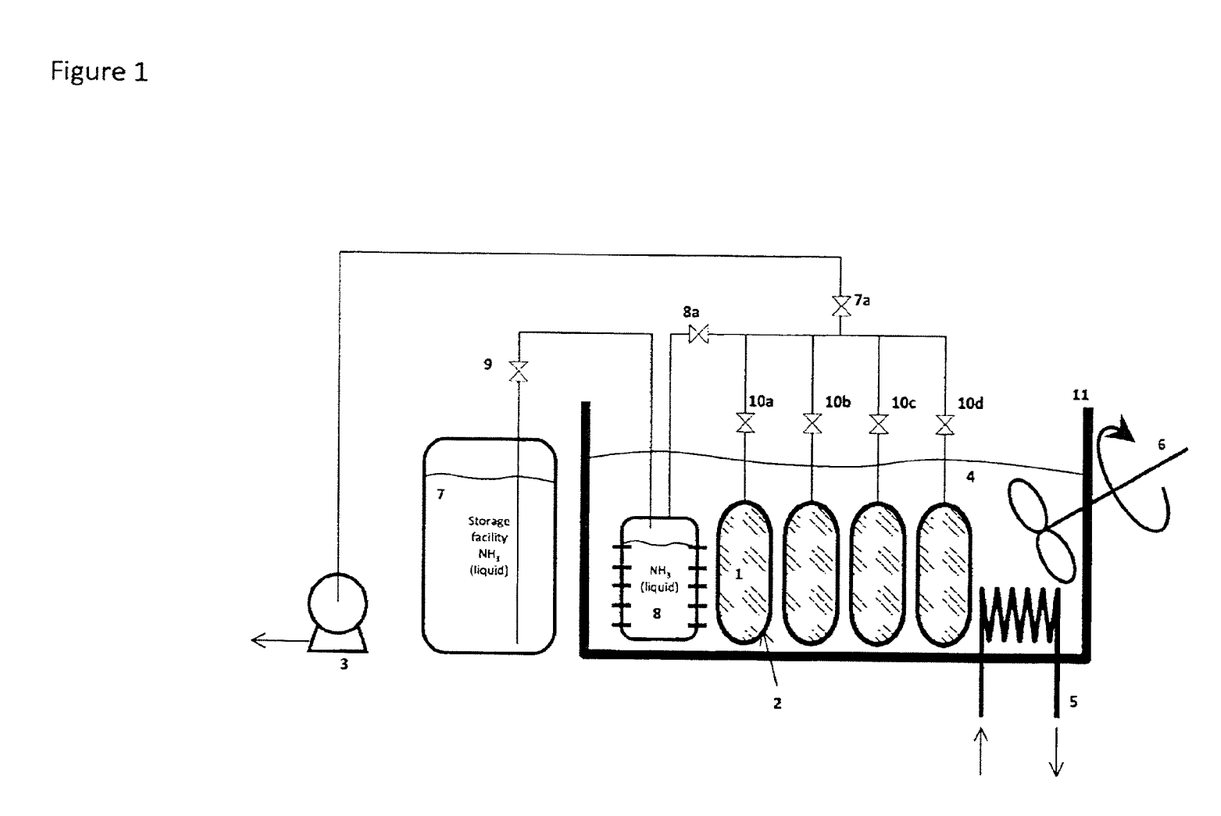
FIG. 1 shows an example of an embodiment of the invention where multiple storage cartridges are being saturated or re-saturated with ammonia from a liquid storage tank. Cooling of the cartridges are done by external cooling as well as by evaporation of ammonia linked to the cooling medium.

FIG. 1 shows an example of implementing the general procedure of the present invention in a parallelized manner with a plurality of storage containers.

A number of containers 2 containing ammonia-depleted or ammonia-empty storage material 1 have undergone an optional pre-check as mentioned above and then N (here shown as four units) containers 2 are placed in a compartment 11 containing a thermostatting medium 4. All containers 2 may have the same or different degrees of depletion or emptiness of ammonia in the ammonia storage material 1 inside. Before saturation or re-saturation, in an optional step the containers 2 are connected to a manifold with valves 10a-10d that includes connection to a pump 3 with a valve 7a in between and a connection to an ammonia evaporator or evaporation chamber 8 with valve 8a and the evaporator 8 is connected to a liquid ammonia tank or unit 7 with a valve 9 to control the feed of ammonia from the liquid tank. The procedure of operation is the following: Then pump 3 is activated and valves 10a-d and 7a are opened to evacuate the containers. Pump 3 remains activated until the gas that leaves the container has an ammonia content of at least about 90% by volume which usually means that the remaining pressure is low. This eliminates any diffusion limitation of ammonia during the saturation or re-saturation because ammonia will simply flow towards the storage sites in the pore structure of the material 1 instead of diffusing through an inert gas.

With the N containers being in contact with the thermostatting medium 4, either in direct contact as shown via placement in the compartment 11, or optionally in indirect contact, for example using a mantle or jacket as heat exchanger, the process units are ready to absorb ammonia and to remove the heat of absorption. The thermostatting medium 4 has a temperature level $T_T$. By opening the valves 10a-d and 8a the absorption process starts and by having the link between the evaporator 8 and the thermostatting medium 4, a suitable pressure, $P_S$, which is equal to or lower than the corresponding liquid condensation pressure in the container, is automatically obtained. The storage container 7 and the valve 9 can be used to ensure suitable ammonia feed to the evaporator 8.

The absorption process is carried out for a certain time t defined by the time it takes for a fully ammonia-depleted or ammonia-empty cartridge (which can be verified by weighing the cartridge) to reach a specified minimum degree of saturation at the given operating temperature and pressure thereby ensuring that all N containers will reach a saturation degree higher than or equal to the required level without having process requirements for individual container monitoring during the saturation or re-saturation process.

It will be advantageous if the saturation degree obtained by the saturation or re-saturation process is equal to or higher than about 80%, about 90%, about 95% or even about 98% or 99% of the maximum capacity.

In some embodiments of carrying out the parallelized process, it may be advantageous to enforce the constraint of $P_S \leq P_T$ only during the final phase of absorption of the last about 25% of the target capacity of ammonia or the last about ⅓ of the total time needed for saturation or re-saturation. In principle, the fundamental condition is to have a pressure that is equal to or lower than the coldest spot in the cartridge knowing that it will be over $T_T$ in most of the cartridge but it requires impractical implementation of multiple thermocouples in each of containers. Therefore, the condition $P_S \leq P_T$ is especially desirable when the absorption process slows down at the end and the different cartridge temperatures throughout the containers become close to $T_T$.

FIG. 1 also shows an auxiliary cooling device or means 5 that is used as a means to keep the desired operating temperature $T_T$ of the thermostatting medium 4. The heat released from the containers to the thermostatting medium 4 is only partly consumed by the ammonia evaporation step and the additional cooling 5 is needed to keep the temperature constant or close to the target. Furthermore, a device 6 can be implemented to create forced convection of the fluid around the containers, which in turn will improve the saturation or re-saturation speed that is essentially controlled by the rate of heat transfer and not the actual absorption kinetics inside the material.

Figure 2:
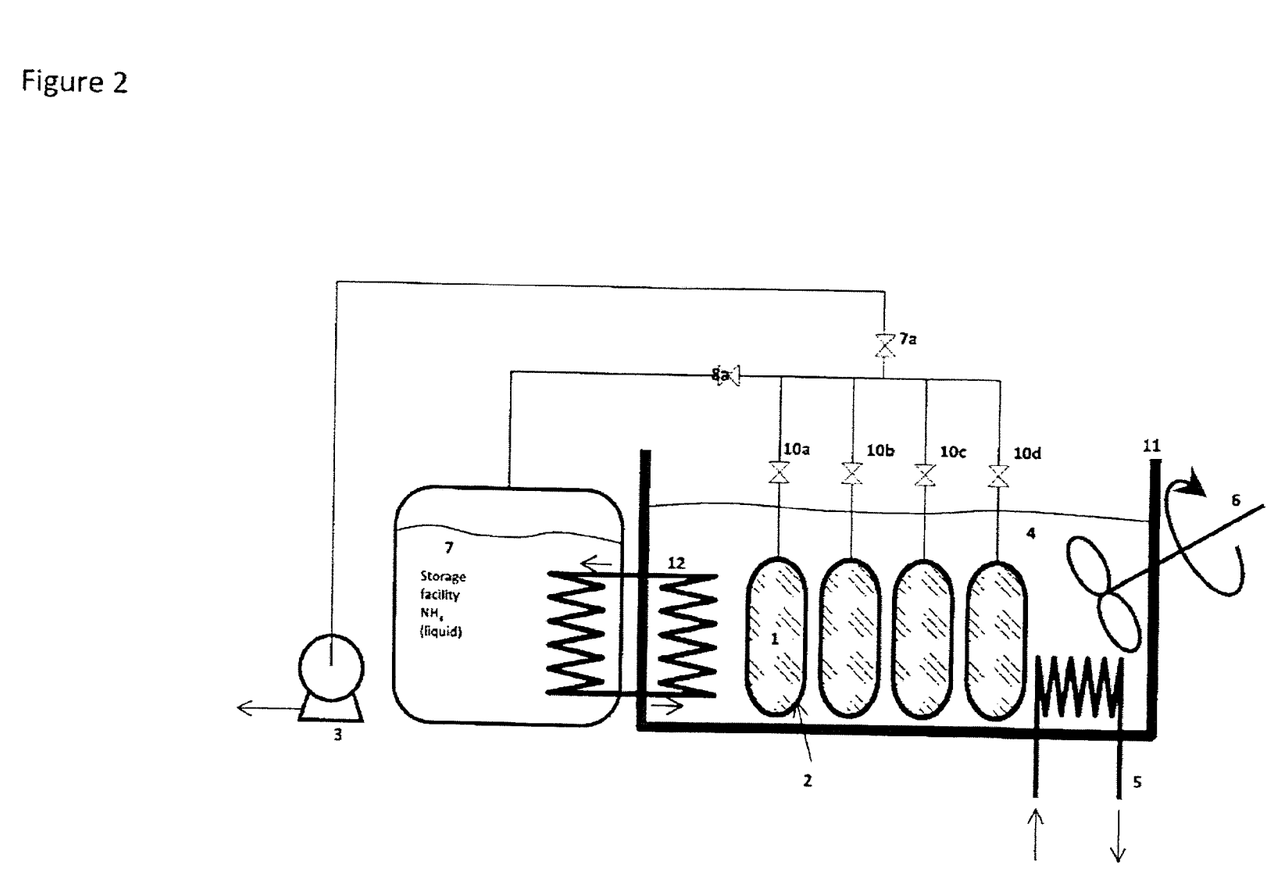
FIG. 2 shows an example of an embodiment of the invention where multiple storage cartridges are being saturated or re-saturated with ammonia from a liquid storage tank. The heat of vaporization of ammonia from the storage tank is provided by heat exchanging with the cooling medium in the saturation compartment.

FIG. 2 shows a setup similar to the one in FIG. 1, the main difference being that the evaporation of ammonia is not done in a specific evaporation chamber 8 but rather in the ammonia storage tank or unit 7 itself and the heat of vaporization is provided by heat exchange 12 between the thermostatting medium 4 and the ammonia tank 7. The heat exchange may be carried out by direct circulation of the thermostatting medium 4 itself or—as illustrated here—by a closed heat exchange circuit between the compartment 11 and the tank 7. The closed circuit may contain the same medium (fluid) as the thermostatting medium 4. The heat exchange is then targeting to keep the storage unit 7 close to a temperature level $T_T$ to give the desired supply pressure $P_S$ to the saturation or re-saturation manifold.

In the parallelized process versions mentioned above, the saturation or re-saturation is considered completed when a certain well-known time (i.e. the time to saturate or re-saturate at least a completely degassed container thereby ensuring that all N containers will reach a saturation degree higher than or equal to the required level without having process requirements for individual container monitoring during the saturation or re-saturation process) is surpassed or when no significant flow of ammonia to the manifold system is observed. This saturation or re-saturation flow may be indirectly monitored or determined by the power requirement for auxiliary cooling 5 because a slow saturation process will not require a lot of additional cooling to keep the temperature level $T_T$.

Furthermore, a final step of applying vacuum is advantageous once the saturation or re-saturation process is terminated. In this case, the applied pressure to the container is relieved by closing valves 8, activating the pump 3 and opening valve 7a. When the pressure has been reduced to the ammonia vapor pressure of the saturated material at the temperature $T_T$, then the valves 10a-d can be closed and the units are ready for final inspection without the risk of moving containers with elevated pressure inside.

The required saturation level, typically about 80%, about 90%, about 95%, about 98% or even about 99% or more, corresponds to a well defined final mass of the saturated or re-saturated cartridge which is defined as the "target mass". Optionally, the mass of each cartridge is measured after saturation or re-saturation and compared to the target mass. If the measured mass is below the target mass the cartridge is rejected.

Figure 3A:
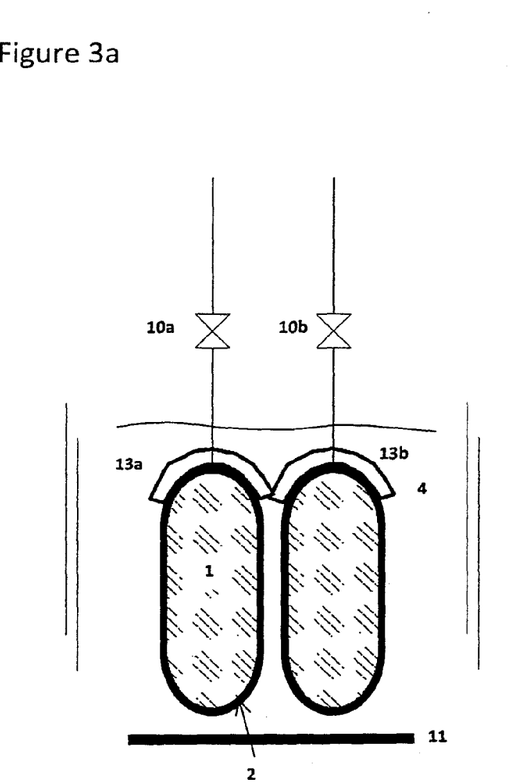
FIGS. 3a and 3b show two cartridges undergoing saturation or re-saturation where the heat is removed by the cooling medium and whereby heat transfer close to the inlet is hindered by either an end-cap insulation layer 13a, 13b or by a less than optimal contact with the cooling fluid. This may improve the mass transfer in the pore structure over the course of the saturation or re-saturation process as the final stage of absorption is occurring close to the inlet only at the end of the process. Furthermore.
Figure 3B:
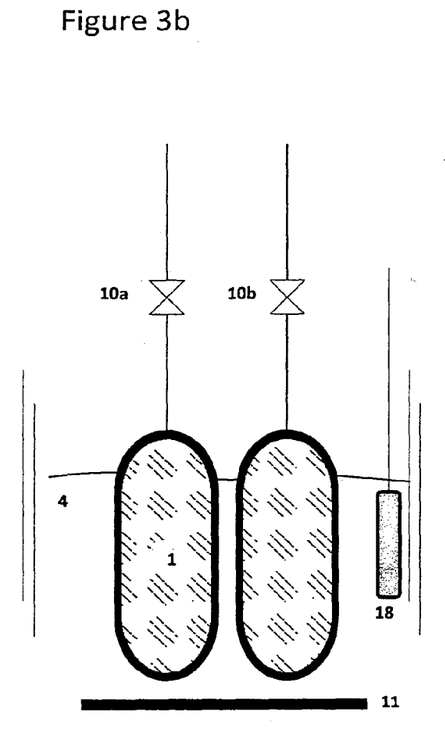

FIGS. 3a and 3b show two cartridges undergoing saturation or re-saturation where the heat is removed by the cooling medium and whereby heat transfer close to the inlet is hindered by either an end-cap insulation layer 13a, 13b or by a less than optimal contact with the cooling fluid. This may improve the mass transfer in the pore structure over the course of the saturation or re-saturation process as the final stage of absorption is occurring close to the inlet only at the end of the process.

As mentioned above, the end-cap insulation may cover e.g. about 50% or less, about 25% or less or about 10% or less, such as about 5% or even less, of the surface of the cartridge during part of or the whole saturation time, e.g. such that about 50% of the surface are covered in the beginning the process and less and less, e.g. down to about 5%, during the progress of saturation or re-saturation, Furthermore, FIG. 3b shows an ultra-sound generator 18 that may influence the stability of the material during the process. Sound waves propagating in the thermostatting medium can reduce the mechanical stress of the material to the walls of the container during the saturation process.

Figure 4:
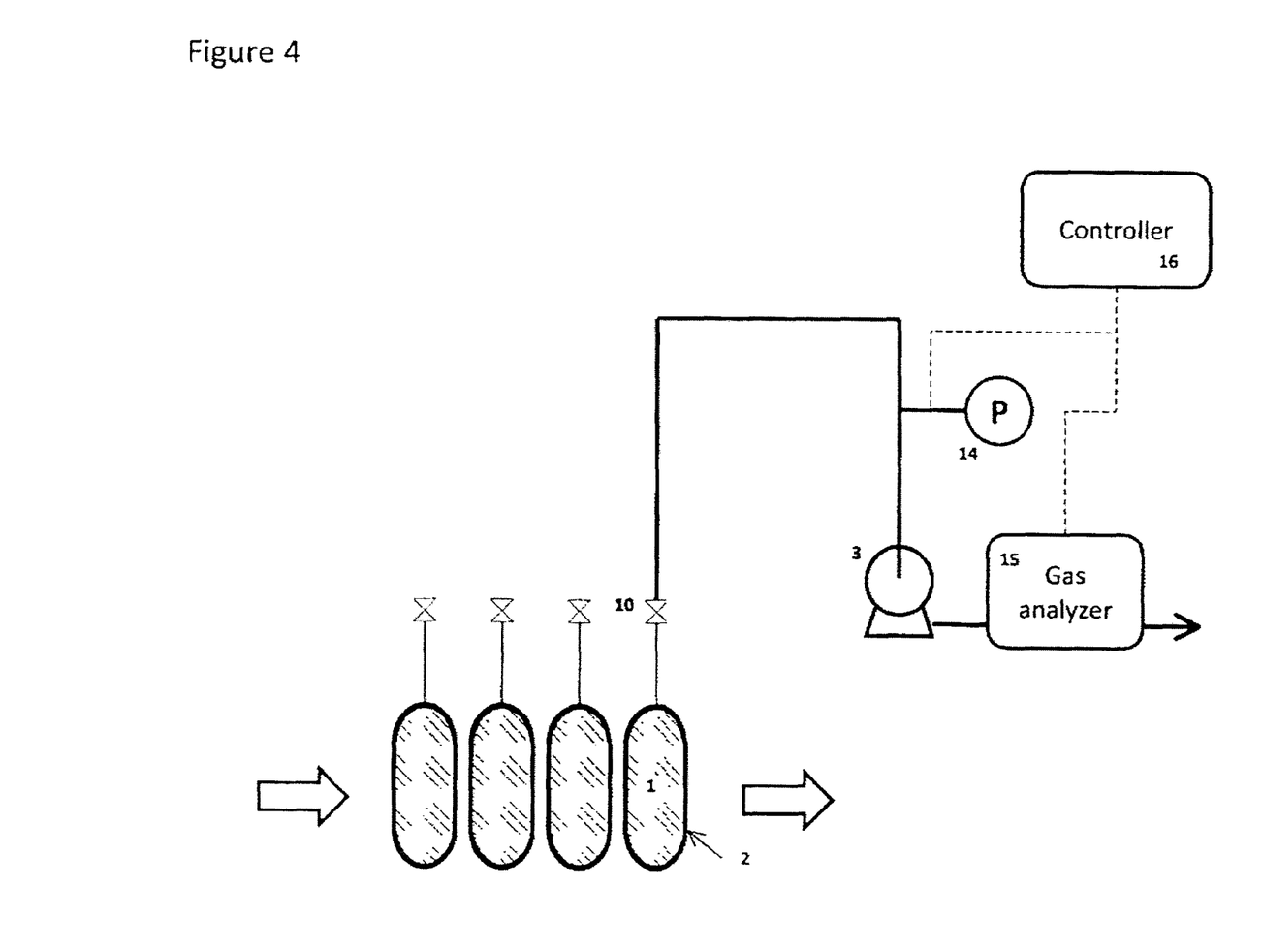
FIG. 4 shows an example of a setup for quality check and inspection of containers before the saturation or re-saturation step whereby a pump is connected to the container with link to a gas analyzer and a pressure sensor.

FIG. 4 illustrates the inspection step before the storage material is saturated or re-saturated. If an analyzer 15 linked to a controller 16 detects unexpected concentration levels of species other than ammonia, then a decision can be made to scrap the container because it is considered damaged.

Also in FIG. 4 is shown a pressure sensor 14 that can be used to detect if there is a leak in the container. When the pump 3 is activated then the pressure should reduce to at least the level of equilibrium vapor pressure level of the ammonia absorbed in the container. If an abnormal high pressure, e.g. close to 1 bar and not significantly below, is observed, then a unit may be scrapped because a lot of air from the surroundings is sucked into the cartridge.

The setup in FIG. 4 may also be used for checking the integrity of the storage material 1 itself. By choosing an analyzer 15 that can detect a variety of species one can determine if the container 2 and/or the material 1 is not in proper condition. As an example, molecules such as $H_2O$, organic species or other small polar molecules like $H_2S$ may be absorbed in the unit because of a leak somewhere in the container. Using the vacuum pump 3, one can also force a release of some of these species into the gas phase and measure the concentration in the analyzer 15. A container may be scrapped, if certain concentration thresholds of foreign species are not fulfilled.

Figure 5:
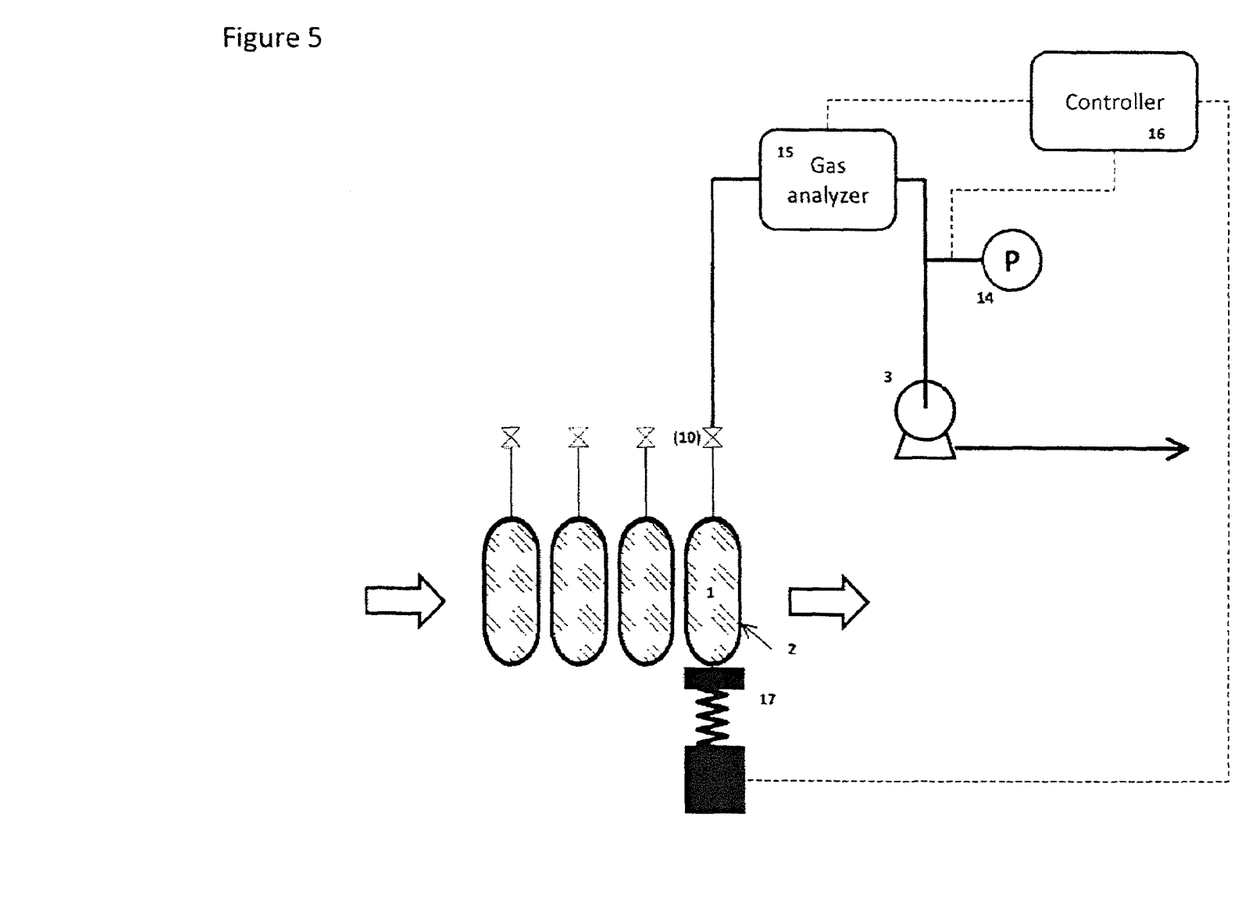
FIG. 5 shows an example of a setup for inspection and quality assurance of the container after saturation or re-saturation. In addition to gas analyzer and pressure sensor means for determining the weight of a container are provided.

FIG. 5 illustrates how after saturation or re-saturation the examination of the saturated or re-saturated cartridges can be done by weighing 17 as well as by using a pump 3 and a gas analyzer 15 to make a final analysis of the composition of the gas inside the saturated or re-saturated unit and also to check if a unit has developed a leak This can also be done with the use of a pressure sensor 14 linked to the controller 16. Lastly, a unit not having obtained the proper mass of ammonia would be scrapped because the inability to absorb the right amount of ammonia would only be a result of a malfunctioning container or improper quality of the storage material.

In FIGS. 4 and 5 the gas analyzer 15 is placed in two different locations. This is to illustrate that there may be an advantage to place it in between the container and the pump to avoid that oil residues of the pump is interfering with the signal from the gas analyzer.

Figure 6:
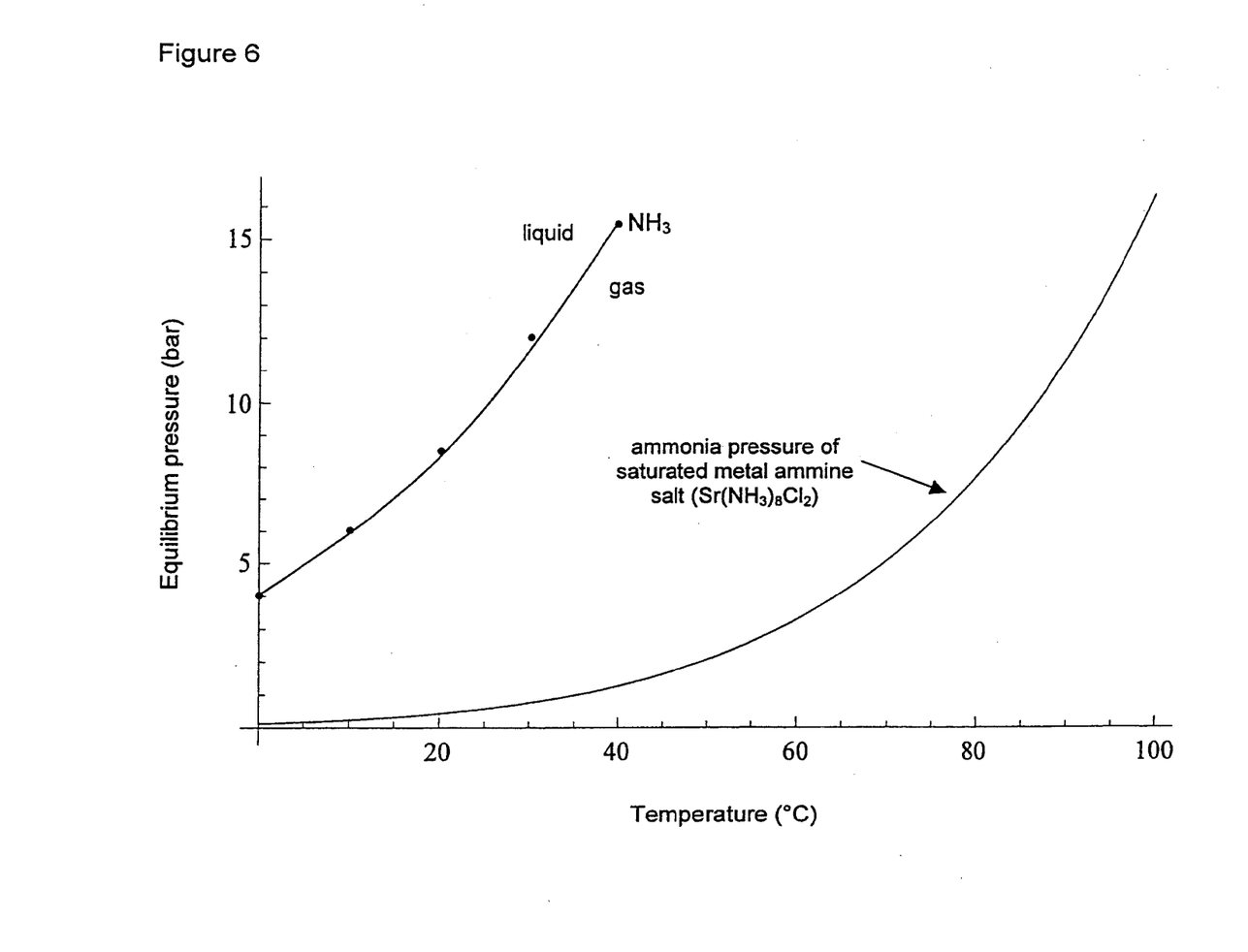
FIG. 6 shows the temperature/pressure curves of the phase boundary of liquid ammonia/gaseous ammonia and of the equilibrium pressure of $Sr(NH_3)_8Cl_2$.

FIG. 6 shows the temperature/pressure curves of the phase boundary of liquid ammonia/gaseous ammonia and of the equilibrium pressure of $Sr(NH_3)_8Cl_2$. It might seem desirable to a person skilled in the art that the temperature, $T_T$, should be chosen as low as possible to accelerate the heat removal from the unit, e.g., if water is the cooling medium, close to about 0° C. (freezing should be avoided). However, as can be seen from FIG. 6, at about 0° C. the vapor pressure of liquid $NH_3$ is rather low, namely about 4.3 bar. Furthermore, the equilibrium temperature of saturated $SrCl_2$ at that pressure is about 60° C. At about 40° C., the ammonia pressure of liquid ammonia is about 15.5. bar. This pressure corresponds to an equilibrium pressure of ammonia-saturated $SrCl_2$ at a temperature of about 99° C. This means that the $SrCl_2$ can be present at a temperature of about 99° C. (reached e.g. by the exothermic absorption of ammonia) and be fully saturated at that ammonia pressure.

Figure 7:
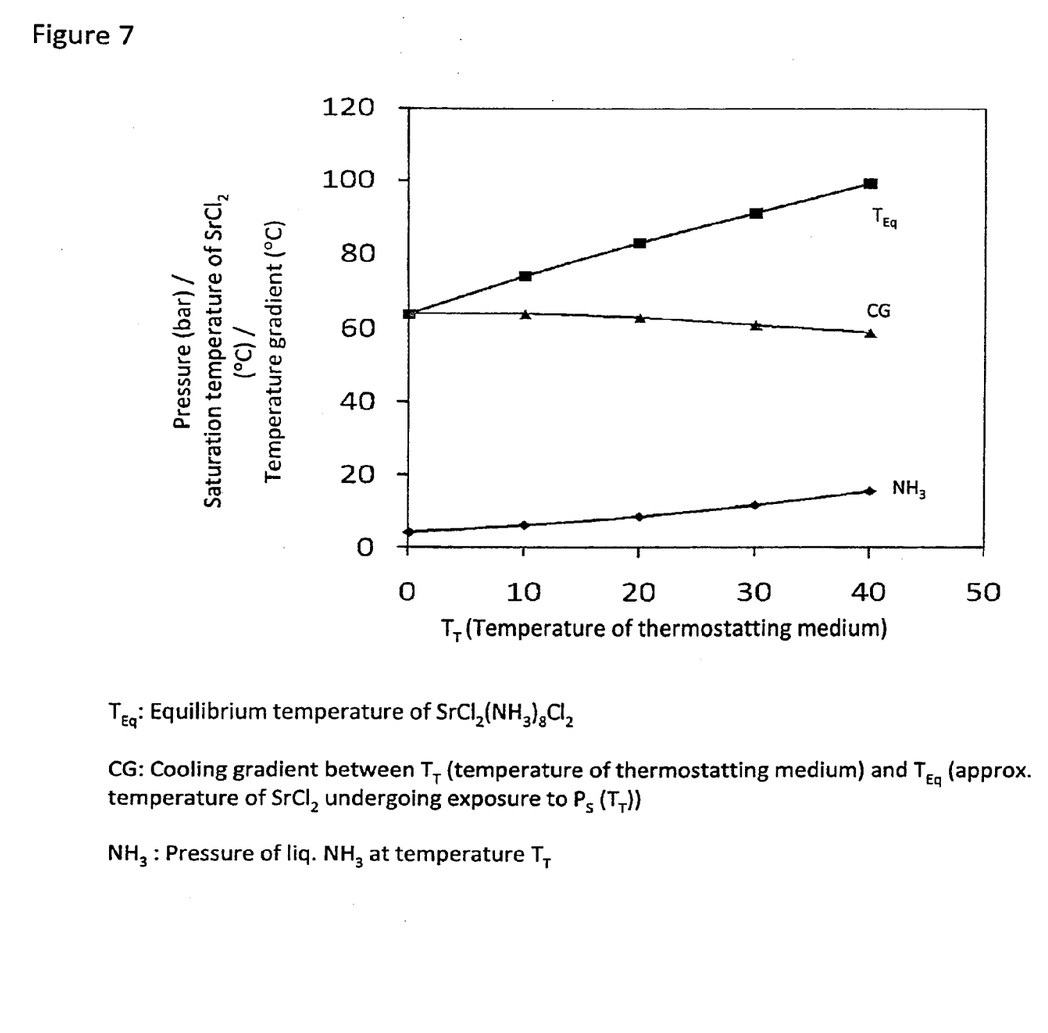
FIG. 7 shows the temperature/pressure curves of the phase boundary of liquid ammonia/gaseous ammonia, the equilibrium temperature of $Sr(NH_3)_8Cl_2$ at pressure $P_S(T_T)$ and the cooling gradient between $T_T$ (temperature of thermostatting medium) and $T_{Eq}$ (approximate temperature of $SrCl_2$ undergoing exposure to $P_{S'}$ at temperature $T_T$).

FIG. 7 shows a link between $T_T$ and the resulting approximate heat transfer temperature gradient that would exist between the thermostatting medium and the material in the container. This is determined as the gradient between temperature the thermostatting medium ($T_T$) and the equilibrium temperature, $T_{Eq}$, of $SrCl_2$ in saturated form from a container, if the material should have the same desorption pressure as $P_S$ (determined by vaporization of ammonia at the temperature $T_T$). It can be seen that the ammonia pressure from liquid ammonia has a level of about 4.3 bar at 0° C. and 15.5 bar at 40° C. The corresponding range of $T_{Eq}$ for the $SrCl_2$-material with same desorption vapor pressure is 64° C. and 99° C. thereby meaning that, if $T_T$ is chosen to be 20° C. and not 0° C., then there is almost the same temperature gradient for heat transfer in the range of 60-64 degrees. Consequently, if one uses the constraint of $P_S \leq P_T$, then that can be obtained by choosing $T_T$ fairly freely in the range of 0-40° C. without a large impact on process time because the heat transfer rate would be roughly the same. The upper limit for $T_T$ would rather be determined by how high pressure one wants to expose to the container given by the wall strength of the unit. In fact, choosing $T_T$ close to room temperature might be an advantage because there would not be any heat loss from the compartment 11 of all the containers, which would be the case if $T_T$ was close to 0° C. (cooling would be required to compensate for ammonia absorption as well as warm-up of the compartment by the surroundings). The auxiliary cooling of the thermostatting medium is accomplished from room temperature and not from an already lower temperature. This makes the total process more energy efficient.

In summary, what is achieved by the invention is a safe, stable and cost-effective process with low power requirements, low amount of individual monitoring on each container during saturation or re-saturation, avoiding undesired ammonia condensation during the process and methods for quality assurance.

The content of all documents, such as patents, patent applications, journal articles and books, cited herein is hereby incorporated by reference in its entirety.

While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A method for saturating or re-saturating ammonia storage material (1) capable of reversibly absorbing and desorbing ammonia in one or more storage containers (2), wherein said material is partly or fully depleted of ammonia, with ammonia to a predetermined saturation degree said method comprising:

a. placing the storage container(s) (2) in direct or indirect contact with a thermostatting medium (4) at a temperature level $T_T \leq$ about 65° C.; and
b. connecting the storage container(s) (2) to a source of gaseous ammonia wherein at least during a part of the method the gaseous ammonia during saturating or re-saturating of the ammonia storage material (1) is at a pressure $P_S \leq$ about $P_T$, wherein $P_S$ is the ammonia pressure during saturating or re-saturating of the ammonia storage material (1) and $P_T$ is the equilibrium vapor pressure of liquid ammonia at the temperature level $T_T$, wherein said pressure $P_S$ is at least about 50% of the equilibrium vapor pressure of liquid ammonia at the temperature $T_T$.

2. A method according to claim 1, wherein the temperature level $T_T$ is of from about 0° C. to about 40° C.

3. A method according to claim 1, wherein said thermostatting medium is water or a monophasic aqueous medium.

4. A method according to claim 1, wherein said predetermined saturation degree is at least about 80%.

5. A method according to claim 1, wherein the controlling of temperature $T_T$ of the thermostatting medium and the dissipation of heat from the container(s) is assisted by a cooling device (5) and/or by creating forced convection conditions in the thermostatting medium by actively circulating (6) the medium or otherwise keeping it in motion.

6. A method according to claim 1, wherein a transfer of heat from the containers (2) produced during saturation or re-saturation to the thermostatting medium is accelerated by creating forced convection conditions in the thermostatting medium by actively circulating (6) the medium or otherwise keeping it in motion.

7. A method according to claim 1, wherein prior to step a. gas is removed from the storage container(s) by means of a vacuum pump until the gas being removed has an ammonia content of at least about 90% by volume.

8. A method according to claim 1, wherein prior to step a. the container is flushed with ammonia or repeatedly pressurized with ammonia and depressurized or treated with any other method for removal of impurities, until the gas remaining in the container has an ammonia content of at least about 90% by volume.

9. A method according to claim 1, wherein the degree of saturation or re-saturation of the ammonia storage material is monitored by the flow of ammonia to the unit or by the power required for the cooling means to maintain a temperature $T_T$ of the thermostatting medium.

10. A method according to claim 1, wherein the part of the method where the gaseous ammonia is at a pressure $P_S$ which is lower than or equal to the equilibrium vapor pressure $P_T$ of liquid ammonia at the temperature $T_T$ is the final part of the method during about the last about ⅓ of the total saturation period or wherein the last about 25% of the predetermined saturation degree is achieved.

11. A method according to claim 1, wherein the ammonia vapor pressure is generated by evaporating of ammonia using the thermostatting medium at the temperature $T_T$ as a heat source for the evaporation of ammonia by evaporating ammonia in an evaporation chamber (8) in contact with the thermostatting medium at the temperature $T_T$, said evaporation chamber being fed with liquid ammonia from a separate liquid ammonia storage unit (7), and/or by evaporating ammonia using the thermostatting medium at the temperature $T_T$ as a heat transfer medium to provide the heat of vaporization to the liquid ammonia storage unit (7).

12. A method according to claim 1, wherein gas evacuated by the pump from the container is analyzed (15) with respect to a tracer molecule to which the outside of the container(s) is exposed to evaluate if there is a leak in the container(s) and/or is analyzed with respect to $H_2O$, organic compounds or other volatile compounds to evaluate if the ammonia storage material in the container(s) contains undesired high concentrations of said compounds.

13. A method according to claim 7, where a pressure (14) measured during evacuation by a pump is used to determine if the container has a leak.

14. A method according to claim 1, wherein a plurality of storage containers is used, said method comprising
a. placing the plurality of storage containers in direct or indirect contact with said thermostatting medium at the temperature $T_T \leq$ about 65° C.:
b. connecting the plurality of storage containers through a manifold (10a to 10d) having as many connections as there are containers present to a source of gaseous ammonia wherein at least during a part of the method the gaseous ammonia during saturating or re-saturating of the ammonia storage material is at a pressure $P_S \leq$ about $P_T$, wherein $P_S$ is the ammonia pressure during saturating or re-saturating of the ammonia storage material and $P_T$ is the equilibrium vapor pressure of liquid ammonia at the temperature $T_T$,
and supplying ammonia through the manifold for a time t which is needed for a container containing fully depleted ammonia storage material to reach a predetermined degree of saturation.

15. A method according to claim 1, further comprising one or more of the steps of
c. weighing the or each container after saturation or re-saturation whereby the saturation degree may be determined;
d. evacuating the container(s) by a pump after the saturation or re-saturation process to de-pressurize the units to or below the equilibrium ammonia pressure of the ammonia storage material having the predetermined saturation degree at $T_T$,
e. comparing the mass of the or each container with a target mass corresponding to the predetermined degree of saturation;
g. rejecting any container the mass of which is lower than the target mass.

16. A method according to claim 1, further comprising leak testing of the or each container after saturation or re-saturation.

17. A method according to claim 1, wherein ultra-sound waves are applied to the containers during saturation or re-saturation directly or via the thermostatting medium.

18. A method according to claim 1, wherein the container is in direct or indirect contact with the thermostatting medium in its entirety.

19. A method according to claim 1, wherein only a part of the container is in direct or indirect contact with the thermostatting medium.

20. A method according to claim 1, wherein the direct or indirect contact with the thermostatting medium is increased with increase of saturation or re-saturation by raising the level of the thermostatting medium in a thermostattting bath in which the container is immersed, starting from the end of the container which is not connected to the source of gaseous ammonia to the end connected to the source of gaseous ammonia.

21. A method according to claim 1, wherein the end of the container connected to the source of gaseous ammonia is insulated by covering 50% or less of the surface of the container with an insulating material during at least a part of saturation or re-saturation time.

22. A method according to claim 6, wherein the cooling device (5) and/or other temperature controlling device and/or the forced convection conditions provide for a temperature gradient or heat dissipation gradient such that more heat is dissipated from an end of the container which is not connected to the source of gaseous ammonia than from the end connected to the source of gaseous ammonia.

23. A method according to claim 1, wherein the ammonia storage material is charged with one or more heat-conducting materials or surrounded by one or more gas-permeable enclosures made of one or more flexible heat-conducting materials having a higher thermal conductivity than the ammonia storage material and not being an ammonia storage material themselves.

24. A method according to claim 23, wherein the heat-conducting material comprises a metal or metal alloy, graphite, composite material, mixtures thereof.

25. A method according to claim 23, wherein the thermal conductivity of the heat-conducting material is at least about five times of that of the ammonia storage material over at least a temperature range of from about −70° C. to about 250° C.

* * * * *